Oct. 12, 1948.                W. D. HENGST                2,451,218

QUICK DISCONNECT COUPLING

Filed July 13, 1946

INVENTOR
W. D. HENGST
BY
ATTORNEY

Patented Oct. 12, 1948

2,451,218

UNITED STATES PATENT OFFICE 2,451,218

QUICK DISCONNECT COUPLING

Walter D. Hengst, Roscoe, Calif., assignor to Bendix Aviation Corporation, South Bend, Ind., a corporation of Delaware Application July 13, 1946, Serial No. 683,400

5 Claims. (Cl. 284—19)

1

This invention relates to quick detachable couplings for making and breaking connection between two fluid lines and has to do particularly with the type of coupling that incorporates automatically actuated valves for closing the end of each line when the connection is broken. Even more specifically, the invention relates to that type of coupling in which no air can be introduced into the line and no fluid can be lost from the line at the time of making or breaking the connection.

An object of the invention is to provide a fluid coupling of the type referred to that is relatively inexpensive to build and can be quickly connected and disconnected without the application of large forces thereto.

Another object is to provide a fluid coupling of the type referred to incorporating a double seal for giving added insurance against leakage out of one of the lines when the coupling is disconnected.

Other more specific objects and features of the invention will become apparent from the detailed description to follow with reference to the drawing, in which.

Figure 1:
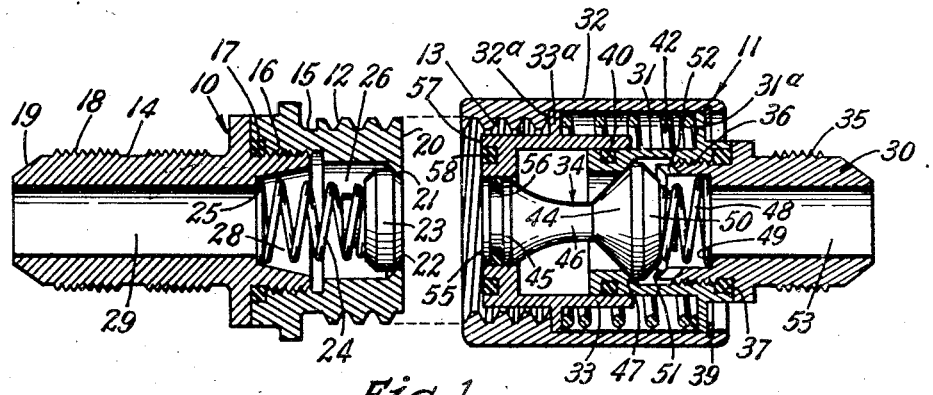
Fig. 1 is a longitudinal section showing the two members of a coupling in accordance with the invention, in separated relation.

Referring to Fig. 1, my coupling comprises a pair of cooperating coupling members 10 and 11 respectively which are adapted to be connected to separate fluid lines and which can be connected to each other to complete fluid connection between the associated lines.

The members 10 and 11 constitute male and female members respectively, the member 10 having external threads 12 adapted to threadly engage internal threads 13 in the member 11.

The member 10 may conveniently be formed in two sections 14 and 15, which sections are connected together by screw threads 16, a seal between the two sections being effected by a gasket 17 of rubber or other compressible material. The section 14 is shown as having external threads 18 and a bevelled end 19 for connection to a fluid line in a known manner.

The section 15 has a flat outer end 20 containing a central orifice 21 which constitutes the outer end of a valve seat 22 which may be closed

2 by a poppet 23, the latter being constantly urged outwardly into closed or seating position by a helical compression spring 24, which is compressed between a rear face of the poppet 23 and a shoulder 25 formed in the section 14. The seat 22 communicates with a relatively large passage 26 in the section 15 immediately back of the poppet 23 to permit flow of fluid around the edges of the poppet when the latter is in open position. The rear end of the passage 26 communicates with the forward end of a tapered passage 28 in the forward end of the section 14, which in turn communicates with a straight passage 29 which extends to the left end of the section 14.

The other coupling member 11 includes as its main parts: a body section 30, a body section 31, a swivel sleeve 32, a valve sleeve 33, and a valve element 34.

The body section 30 has external threads 35 thereon for connection to a fluid line by known means, and is joined to the body section 31 by screw threads 36, a seal being effected between the two sections by means of a gasket 37. The body section 31 has an outwardly extending flange 31a which is adapted to be engaged by a removable retainer ring 39 in the swivel sleeve 32. The swivel sleeve 32 carries the internal threads 13 that engage the external threads 12 of the other coupling member 10, and the movement of the swivel sleeve 32 onto the member 10 carries the body section 31 toward the member 10. The exterior surface of the body section 31 to the left of the flange 31a is smoothly cylindrical and in sliding relation with the internal cylindrical surface of the valve sleeve 33, a round or O ring seal 40 being provided in a groove in the external surface of the body section 31 to prevent fluid leakage between these two parts.

Sleeve 33 is normally in extended relation with respect to the body section 31 because of a helical compression spring 42 which is compressed between the flange 31a of the body section 31 and a flange 33a on the valve sleeve 33. Movement of the valve sleeve 33 away from the body section 31 is limited by contact of the flange 33a with a shoulder 32a on the swivel sleeve 32.

The forward end of the valve sleeve 33 is thickened internally to provide a front annular face 57 which is adapted to bear against the face 20 on the complementary member 10. This face 57 contains an annular groove containing a gasket 58 which effects a seal against the face 20 of the complementary member when the two members are screwed together.

The valve element 34 consists of a poppet section 44 at the right end, a piston section 45 at the left end, and an intermediate waist section 46 which interconnects the sections 44 and 45. Normally the poppet 44 seats against a seat 47 in the body section 31, to prevent flow of fluid from right to left through the coupling. The poppet is urged into closed or seating position by a compression spring 48 which is compressed between the right end of the valve element 34 and a shoulder 49 in the body section 30. Under certain conditions to be described later, the valve element 34 is moved to the right, compressing the spring 48 in so doing. Such movement to the right is limited by contact of a frusto-conical face 50 on the right end of the valve element 34 with a discontinuous annular shoulder 51 on the left end of the body section 30. The shoulder 51 is discontinuous to provide windows 52 through which fluid can flow past the conical face 50 when the valve element 34 is in the extreme right position.

When the coupling is broken as shown in Fig. 1, the coupling member 11 is sealed against escape of fluid from the bore 53 thereof, by seating of the poppet 44 against the seat 47. Leakage is further prevented by the fact that the piston section 45 of the valve element 34 is positioned within a bore 55 in the thickened left end of the valve sleeve 33 and is sealed with respect thereto by an O ring seal 56 which is positioned within an annular groove formed in the piston element 45.

To connect the two members 10 and 11 of the coupling, they are brought together and the swivel sleeve 32 of the member 11 is screwed onto the male thread 12 of the coupling member 10. As is apparent from inspection of Fig. 1, the swivel sleeve 32 extends beyond the face 57 of the coupling member 11, so that there is no difficulty in starting the internal thread 13 onto the external thread 12. No resistance to this connection is offered until the face 57 of the member 11 seats against the face 20 of the member 10. Thereafter, the body sections 30 and 31 are carried to the left by the swivel sleeve 32, while the valve sleeve 33 remains stationary. Initially, the valve element 34 also remains stationary, because its left end abuts against the end of the poppet 23 in the member 10. Therefore the leftward movement of the body section 31 by the swivel sleeve 32 breaks the seat 47 away from the poppet portion 44 of the valve element 34, to produce fluid connection between the bore 53 and the bore of the valve sleeve 33. However the seal 56 is still effective to prevent the flow of fluid between the two coupling members 10 and 11.

Figure 2:
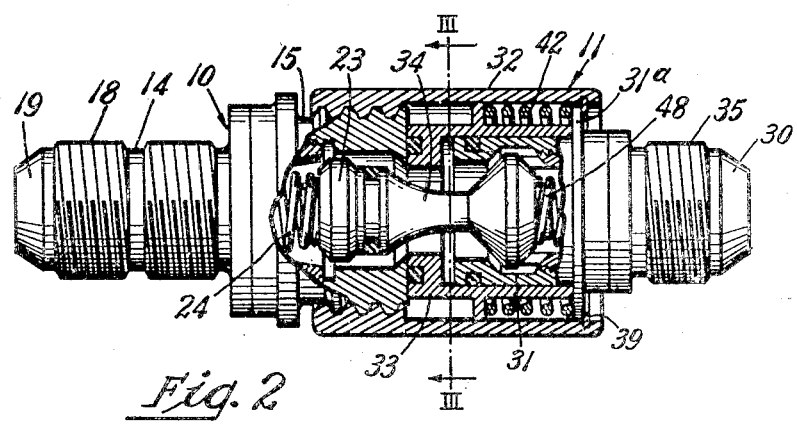
Fig. 2 is a view partly in section and partly in elevation showing the two coupling members brought together in abutting sealing relation for forming a fluid connection between two lines.
Figure 3:
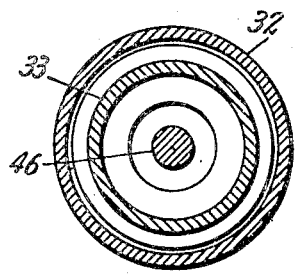
Fig. 3 is a cross section taken in the plane III—III of Fig. 2.

Continued movement of the body sections 30 and 31 to the left carries the discontinuous shoulder 51 against the face 50 of the valve element 34 so that further movement of the body sections 30 and 31 carries the valve element 34 therewith. Since the valve sleeve 33 is restrained from movement by contact of its left end face 57 with the face 20, the piston section 45 is carried out of the bore 55, opening the poppet 23 in the process, and establishing free passage for fluid flow through the coupling. This condition is shown in Fig. 2.

To disconnect the coupling, the swivel sleeve 32 is unscrewed from the member 10, permitting the springs 24, 42, and 48 to restore the poppet 23, and valve element 34 to their normal positions as shown in Fig. 1.

At the time the two members 10 and 11 are brought together, there is no space therebetween for the trapping of air which might later be introduced into the line when the members are fully joined. Likewise when the members are separated there is no fluid lost from the line.

It will be noted from Fig. 1 that there is a double seal in the member 11, one between the valve seat 47 and the poppet 44, and one between the bore 55 and the piston 45. However, this double seal is not essential and under some circumstances it may be desirable to dispense with the seat 47 and/or poppet 44. Thus the seat 47 can be interrupted like the shoulder 51.

The coupling is composed of few and simple parts that are easily manufactured and easily assembled.

To insure opening of the poppet 44 away from the seat 47 when the two members of the coupling are connected together despite high pressure in the bore 53, it is desirable to have some stop means for limiting opening movement of the poppet 23. This stopping function can be performed by the spring 24. Thus the spring can be so dimensioned that successive turns contact each other at the desired fully opened position of the poppet 23. As a result further movement of the two members 10 and 11 again causes the poppet 23 to press against the valve element 34 and positively move the latter to carry the poppet 44 away from the seat 47.

It is to be understood that although for the purpose of explaining the invention, a particular embodiment thereof has been disclosed in detail, various departures from the exact construction shown can be made without departing from the invention which is to be limited only to the extent set forth in the appended claims.

I claim:

1. A fluid-conduit coupling comprising: two detachably connectable conduit members; one of said members having an inwardly movable spring-seated valve and an annular sealing surface surrounding said valve; the other member having internal and external elements; said external element having a sealing surface for contacting and sealing with said sealing surface of said one member and having a passage terminating in a cylindrical surface adjacent its outer end; means supporting said external element in reciprocal, sealing relation with respect to said other conduit member between an extended position and a retracted position; means for moving said conduit members together whereby said external element is shifted from its extended to its retracted position by force thereagainst of said sealing surface of said one member; means supporting said internal element for reciprocal movement with respect to said other conduit member; said internal element having a piston adjacent its outer end that seals with said cylindrical surface of said external element when the latter is in its extended position and that extends beyond and is clear of said cylindrical surface when said external element is in retracted position.

2. A coupling as described in claim 1 in which said internal element is movable longitudinally between inner and outer positions and includes a poppet section, and said other member includes a seat cooperating with said poppet section to block fluid flow through said other member when said internal element is in its outer position and permit fluid flow when the internal element is in its inner position, said internal element being moved from its outer to its inner position by said spring-seated valve in response to movement of said two members together.

3. A coupling as described in claim 1 in which said internal element comprises a solid waist section of reduced lateral dimensions adjacent said piston and means at the inner end of said waist section for limiting longitudinal movement of said internal element relative to said other member.

4. A coupling as described in claim 1 in which said internal element has a poppet section at its inner end and a waist section of reduced lateral dimensions interconnecting said piston and said poppet section, said other member defining a valve seat for sealing with said poppet section and limiting outward movement of said internal element, and defining shoulder means for contacting said poppet section and limiting inward movement of said internal element while permitting fluid flow past said poppet section.

5. A coupling as described in claim 1 in which said internal element is movable longitudinally between inner and outer positions, and includes a poppet section, and said other member includes a seat cooperating with said poppet section to block fluid flow through said other member when said internal element is in its outer position, and permit fluid flow when the internal element is in its inner position, spring means urging said internal element from its inner to its outer position, said spring means being weaker than said spring-seated valve, whereby said spring means is overcome and said internal element is moved from its outer to its inner position by said spring-seated valve in response to movement of said two members together.

WALTER D. HENGST.

REFERENCES CITED

The following references are of record in the file of this patent:

UNITED STATES PATENTS

| Number | Name | Date |
| --- | --- | --- |
| 879,880 | Landau | Feb. 25, 1908 |
| 1,335,521 | Murphy | Mar. 3, 1920 |
| 2,254,997 | Fisher | Sep. 2, 1941 |
| 2,311,239 | Main | Feb. 16, 1943 |
| 2,391,022 | Main | Dec. 18, 1945 |